United States Patent
Yoo et al.

(10) Patent No.: US 12,029,206 B2
(45) Date of Patent: Jul. 9, 2024

(54) WATER SUPPLY DEVICE FOR PETS

(71) Applicant: LG ELECTRONICS INC., Seoul (KR)

(72) Inventors: Hyunsun Yoo, Seoul (KR); Sungkyung Kim, Seoul (KR); Joogyeom Kim, Seoul (KR); Yousook Eun, Seoul (KR); Jaehung Chun, Seoul (KR); Myongsun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 66 days.

(21) Appl. No.: 17/277,915

(22) PCT Filed: Sep. 19, 2019

(86) PCT No.: PCT/KR2019/012181
§ 371 (c)(1),
(2) Date: Mar. 19, 2021

(87) PCT Pub. No.: WO2020/060249
PCT Pub. Date: Mar. 26, 2020

(65) Prior Publication Data
US 2021/0345581 A1 Nov. 11, 2021

Related U.S. Application Data

(60) Provisional application No. 62/733,393, filed on Sep. 19, 2018.

(30) Foreign Application Priority Data

Nov. 1, 2018 (KR) .......................... 10-2018-0132708

(51) Int. Cl.
*A01K 7/02* (2006.01)

(52) U.S. Cl.
CPC ...................................... *A01K 7/02* (2013.01)

(58) Field of Classification Search
CPC . A01K 7/02; A01K 7/022; A01K 7/04; A01K 7/06; A01K 39/00; A01K 39/02;
(Continued)

(56) References Cited

U.S. PATENT DOCUMENTS

| 4,164,201 A | 8/1979 | Vanderhye |
| 7,270,082 B2 * | 9/2007 | Plante .................... A01K 7/022 119/74 |

(Continued)

FOREIGN PATENT DOCUMENTS

| EP | 3315022 | 5/2018 |
| GB | 1079663 | 8/1967 |

(Continued)

OTHER PUBLICATIONS

International Search Report dated Jan. 17, 2020 issued in Application No. PCT/KR2019/012181.
(Continued)

*Primary Examiner* — Kristen C Hayes
(74) *Attorney, Agent, or Firm* — KED & ASSOCIATES, LLP

(57) ABSTRACT

The present disclosure relates to a water supplier for a pet. The water supplier for a pet includes a water tub, a pump pumping water stored in the water tub, a water supply pipe delivering water discharged from the pump, and a water supply plate supplied with the water from the water supply pipe, in which a height of the water supply plate is adjustable.

20 Claims, 13 Drawing Sheets

(58) Field of Classification Search
CPC .......... A01K 7/005; A01K 7/00; A01K 7/025; A01K 5/00; A01K 5/0291; B05B 17/08; B05B 239/16–18; B05B 239/20; B05B 239/28; B05B 239/22; B05B 239/24
See application file for complete search history.

(56) References Cited

U.S. PATENT DOCUMENTS

| | | |
|---|---|---|
| 7,743,698 B2 | 6/2010 | Muir et al. |
| 10,165,753 B1* | 1/2019 | Huang ................ A01K 7/02 |
| 11,026,398 B1* | 6/2021 | Hoffman ............. A01K 7/00 |
| 2005/0166853 A1* | 8/2005 | Plante ................ A01K 5/0114 |
| | | 119/74 |
| 2006/0174838 A1 | 8/2006 | Plante |
| 2009/0205575 A1 | 8/2009 | Rodriguez et al. |
| 2010/0170447 A1* | 7/2010 | Pridgen, Jr. .......... A01K 5/0128 |
| | | 119/61.53 |
| 2013/0174790 A1* | 7/2013 | Lipscomb ............ A01K 7/00 |
| | | 119/74 |
| 2015/0313180 A1 | 11/2015 | Lipscomb et al. |
| 2021/0144963 A1* | 5/2021 | Wang ................ C02F 9/20 |

FOREIGN PATENT DOCUMENTS

| | | |
|---|---|---|
| JP | S58-062859 | 4/1983 |
| JP | 2009-022235 | 2/2009 |
| JP | 2016-054663 | 4/2016 |
| JP | 2017-148018 | 8/2017 |
| KR | 20-0328676 | 10/2003 |

OTHER PUBLICATIONS

Chinese Office Action dated May 13, 2022 issued in Application No. 201980075865.5 (English translation attached).

Japanese Office Action dated Apr. 26, 2022 issued in Application No. 2021-515171.

* cited by examiner

WATER SUPPLY DEVICE FOR PETS

CROSS-REFERENCE TO RELATED PATENT APPLICATIONS

This application is a U.S. National Stage Application under 35 U.S.C. § 371 of PCT Application No. PCT/KR2019/012181, filed Sep. 19, 2019, which claims priority to U.S. Provisional Patent Application Ser. No. 62/733,393, filed Sep. 19, 2018 and Korean Patent Application No. 10-2018-0132708, filed Nov. 1, 2018, whose entire disclosures are hereby incorporated by reference.

BACKGROUND OF THE DISCLOSURE

Field of the Disclosure

The present disclosure relates to a water supplier that provides drinking water to a pet, and, more particularly, to a water tub, a pump that pumps water stored in the water tub, and a water supply plate that is disposed in the water tub to be supplied with the water pumped from the pump and to provide the drinking water to the pet.

Related Art

Recently, not only people who raise pets are increasing, and love and interest in pets are gradually increasing, so a lot of devices for pets are being developed.

Pets have to frequently drink water to maintain their biorhythm, but pets are left alone in many cases and have difficulty in communicating with human, so the interest in a water supplier that can always supply clean water to pets are increasing.

US 2015/0313180A1 discloses a "water supply assembly for a pet" that includes a water tub, a pump module with a built-in pump and filter, a water supply pipe for a pump and a connection pipe, and a dome-shaped water supply module in which a bowl for temporarily storing water supplied from the water supply pipe is formed on an upper portion and covers the pump module.

However, the above-described US 2015/0313180A1 may have a situation in which since a height of a water dispenser is fixed, when the height of the water dispenser is too high or too low, pets cannot drink water properly.

SUMMARY

An object of the present disclosure is to provide a water supplier for a pet that enables pets to drink water comfortably regardless of a height of a water dispenser.

The objects of the present disclosure are not limited to the objects described above and other objects will be clearly understood by those skilled in the art from the following description.

In order to achieve the objects, a water supplier for a pet may include: a water tub; a pump pumping water stored in the water tub; a water supply pipe delivering water discharged from the pump; and a water supply plate supplied with the water from the water supply pipe, in which a height of the water supply plate may be adjustable.

The water supply plate may include a replaceable first water supply plate and second water supply plate, and the second water supply plate may be thicker than the first water supply plate.

The water supply plate may include a plurality of replaceable water supply plates, and the plurality of water supply plates may have different thicknesses.

The water supplier for a pet may further include: a plate support installed under the water supply plate to support the water supply plate, in which the water supply plate may be detachable from the plate support.

A center of the water supply plate may be provided with a water supply hole, a nozzle cap may be inserted into the water supply hole, and the nozzle cap may be detachable from the water supply plate.

The water supplier for a pet may further include: an elevator installed under the water supply plate to move the water supply plate up and down; a controller operating the elevator so that the water supply plate reaches a set height.

The water supplier for a pet may further include: a plate support body supporting the water supply plate from a lower side; a water tray installed under the plate support and discharging water dropped from the water supply plate to the water tub; and a slide ring protruding from an upper end portion of the water tray, in which the slide ring may be slidably coupled to the plate support body.

The water tray may include an outer wall and an inner wall spaced apart from the outer wall in an inner direction to form a drain passage, the inner wall may include a guide formed to be inclined downward toward the outer wall, and the slide ring may protrude from the upper end portion of the guide in a direction of the water supply plate.

The plate support body may include a slide ring insert portion formed in a direction perpendicular to the water supply plate, and the slide ring may be slidably coupled through the slide ring insert portion.

The plate support body may include a protrusion formed in the direction of the water tray, and the protrusion has a smooth curved surface.

The water supplier for a pet may further include: a partition plate connected to a lower end portion of the plate support body, in which the elevator may be installed under the partition plate to move the plate support body and the water supply plate up and down together with the partition plate.

An outside of the plate support body may be provided with a light guide plate, and the light guide plate may move together with the plate support body.

The elevator may include a motor, a first gear rotated by the motor, a second gear engaged with the first gear and linearly moving by rotation of the first gear, and the second gear may move linearly in a vertical direction with the water supply plate.

The water supplier for a pet may further include: a plate support body supporting the water supply plate from a lower side; a water tray installed under the water supply plate support body and discharging water dropped from the water supply plate to the water tub; and a slide ring protruding upward from the water tray and inserted into the plate support body, in which the slide ring may be provided with a plurality of coupling holes, and includes a fixing bar installed to selectively penetrate one of the plurality of coupling holes passing through the plate support body.

The plurality of coupling holes may be formed at regular intervals in a vertical direction to the water supply plate.

Advantageous Effects

According to the present disclosure, the water supplier for a pet provides the effect that pets can drink water comfortably by adjusting the height of the water supply plate to suit the pet.

The effects of the present disclosure are not limited to the above-mentioned effects. That is, other effects that are not mentioned may be obviously understood by those skilled in the art from the claims.

DESCRIPTION OF EXEMPLARY EMBODIMENTS

Figure 1:
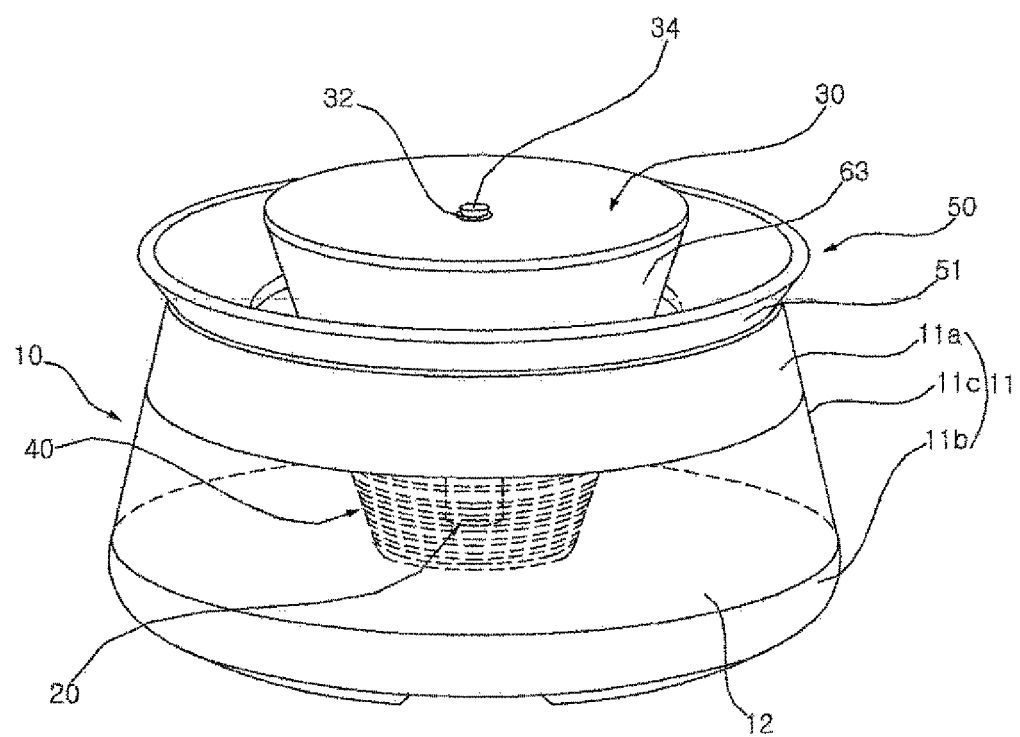
FIG. 1 is a perspective view showing the external appearance of a water supplier for a pet according to a first embodiment of the present disclosure.

Exemplary embodiments described below are illustratively provided to assist in understanding of the present disclosure, and it is to be understood that the present disclosure may be variously modified and executed unlike exemplary embodiments described herein. However, when it is decided that a detailed description for the known functions or components related to the present disclosure may obscure the gist of the present disclosure, the detailed description and concrete illustration will be omitted. Further, the accompanying drawings are not illustrated to scale, but sizes of some of components may be exaggerated to assist in the understanding of the present disclosure.

Terms 'first', 'second', and the like, may be used to describe various components, but the components are not to be construed as being limited by these terms. The terms are used only to distinguish one component from another component.

In addition, terms used in the present disclosure are used only to describe specific exemplary embodiments rather than limiting the scope of the present disclosure. Singular forms are intended to include plural forms unless the context clearly indicates otherwise. It will be further understood that terms "include" or "formed of" used in the present specification specify the presence of features, numerals, steps, operations, components, parts, or combinations thereof mentioned in the present specification, but do not preclude the presence or addition of one or more other features, numerals, steps, operations, components, parts, or combinations thereof.

In addition, it should be understood that terms related to directions used in the present application, for example, terms such as up, down, left, right, front, rear, clockwise, and counterclockwise are intended to describe the relative arrangement position or movement direction of the components shown in the drawings, and do not exclude other directions.

The water supplier for a pet of the present disclosure may basically supply water stored in the water tub to the water supply plate as a pump, and circulate the water supplied to the water supply plate circulates back to the water tub to supply water in various flow states. In this regard, a configuration and operation of the water supplier for a pet according to an embodiment of the present disclosure will be described with reference to FIGS. 1 and 2.

Figure 2:
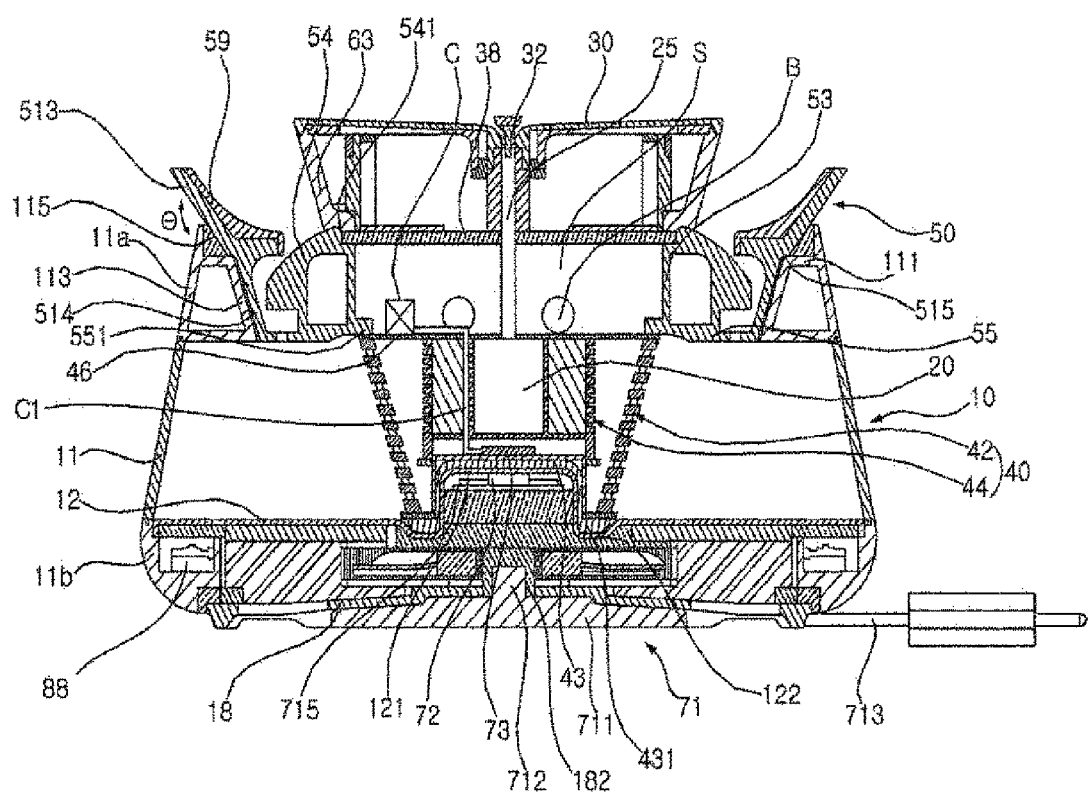
FIG. 2 is a cross-sectional view of the water supplier for a pet shown in FIG. 1.

Referring to FIGS. 1 and 2, the water supplier for a pet according the present disclosure includes a water tub 10 in which water is stored, a pump 20 installed in the water tub to pump water stored in the water tub, a water supply pipe 25 delivering water discharged from the pump 20, and a water supply plate 30 through which water supplied from the water supply pipe 25 overflows.

A water tray 50 that is supplied with water dropping from the water supply plate 30 and discharges the supplied water to the water tub 10 may be disposed between the water tub 10 and the water supply plate 30.

The inside of the water tub 10 may be provided with a filter 40 for filtering foreign substances contained in the water before the water stored in the water tub 10 flows into the pump 20.

In addition, the water supplier for a pet may include a power supply device, a lighting device, a water level sensor, a water temperature sensor, a proximity sensor, a contamination detection sensor, a water temperature maintenance device, a sterilization filter, a gyro sensor, and the like.

Hereinafter, the overall configuration of the water supplier according to the first embodiment of the present disclosure will be described.

Figure 3:
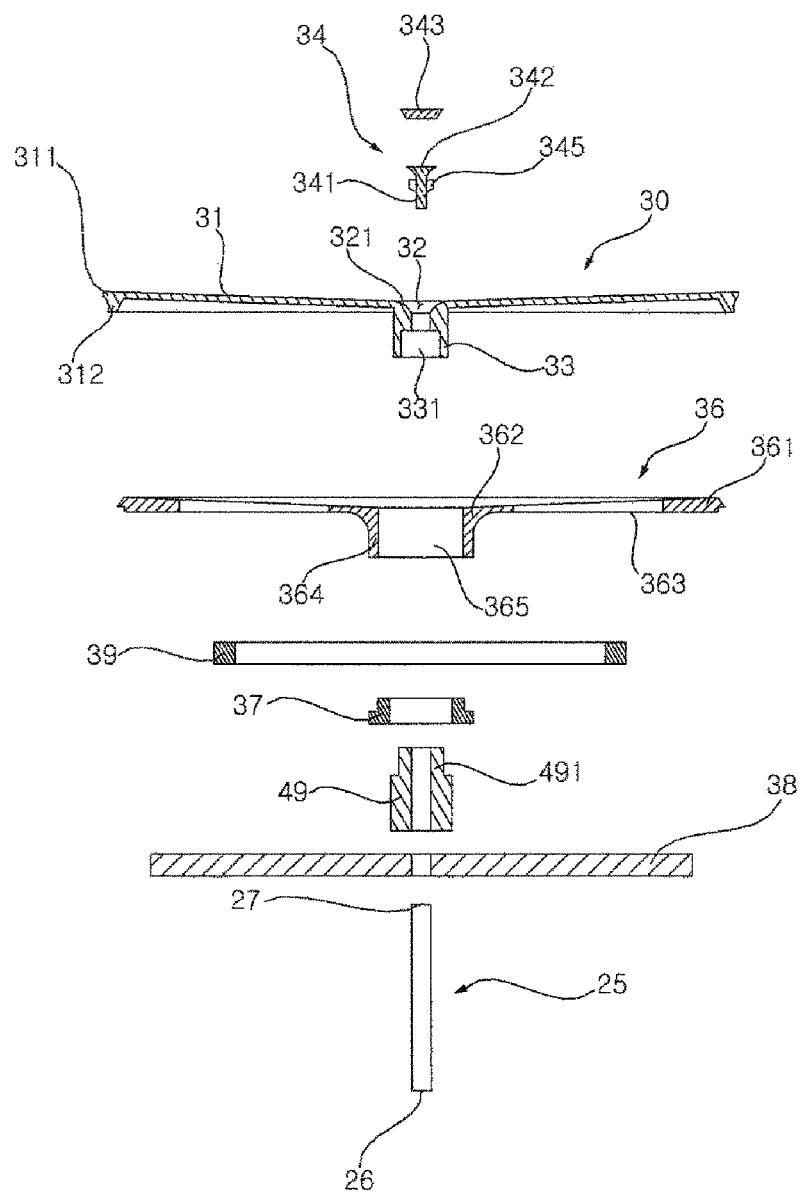
FIG. 3 is an exploded cross-sectional view showing a water supply plate and the peripheral components according to the first embodiment of the present disclosure.

Referring to FIGS. 1 to 3, the water tub 10 may include a side wall being open up and down and forming a side edge of the water tub, and the floor plate 12 disposed under the open bottom of the side wall of the water tub 10. The side wall 11 may include a main side wall 11c extending upward from the edge of the floor plate 12 of the water tub 10, and an upper side wall 11a and a lower edge wall 11b each coupled to the upper and lower sides of the main side wall.

The upper side wall 11a may obliquely extend upward from the main side wall 11c, an inner surface of the upper side wall 11a may be provided with a first protrusive plate 111 and a second protrusive plate 112 protruding toward the center of the water tub 10 and spaced up and down apart from each other, the second protrusive plate 112 may protrude inward further than the protrusive plate 111, and an inner inclined surface 113 inclined closer to the center of the water tub as it goes downward may be formed between the inner ends of the first and second protrusive plates 111 and 112.

A side wall portion 110 of the upper side wall 11a may extend upward in the same direction as the main side wall 11, and thus, may protrude from the main side wall 11 or may extend and protrude to gradually widens or narrow further than the main side wall 11.

In addition, the upper side wall 11a may have an upward protruding wall 114 protruding upward from the first protrusive plate 111, and a packing 115 may be attached to the upward protruding wall 114 and the first protrusive plate 111, whereby the water tray 50 to be described below can be disposed on the upper side wall 11a in close contact with the packing 115.

A protrusion 121 having a cylindrical shape and being convex upward may be formed at the center of the floor plate 12, a wireless power receiver 72 to be described below may be installed in the space inside the protrusion 121 when seen from the bottom of the floor plate 12, and the floor plate 12 may be integrated with the main side wall 11 or may be separately formed and integrated with the main side wall 11. A ring-shaped groove 122 being concave downward may be formed on the floor surface around the protrusion 121.

The lower edge wall 11b may have an outer circumferential surface 116 rounding downward from the lower edge of the main side wall 11, and may protrude from the lower edge wall 11b to have a predetermined width toward the center of the tub 10 from the upper portion of the outer surface 116.

Accordingly, the outer circumferential surface 116 has a lower edge wall surface 117 having a predetermined area overlapping the edge of the floor plate 12 and the gyro sensor 88, etc. may be installed on the lower edge wall surface 117.

In addition, a base 18 spaced downward apart from the floor plate 12 may cover the opening formed at the lower portion of the outer circumferential surface 116 of the lower edge wall 11b, and a space is formed between the lower edge wall 11b, the base 18, and the floor plate 12. Various parts may be installed in the space thus formed, and the base 18 may be disposed over a docking station 71.

Referring to FIGS. 1 and 2, the filter 40 may include a first filter 42 and a second filter 44.

The first filter 42 is formed in a cylindrical shape having considerable rigidity and may have several holes 421 on the side wall. The first filter 42 may include a lower filter cover 43 disposed thereunder and the lower filter cover 43 may be separately formed and combined with the first filter 42 or may be formed as a single part with the first filter 42.

The lower filter cover 43 may be convex upward to be disposed over the protrusion 121 formed on the floor plate 12 of the water tub 10 described above and a flange 431 is formed at the edge of the lower filter cover 43, so as shown in FIG. 2, the flange 431 may be inserted in the groove 122 formed around the protrusion 121 of the floor plate 12.

The second filter 44 may be disposed in the space in the first filter 42 and the pump 20 may be installed in the internal space of the second filter 44.

The first and second filters 42 and 44 may be covered with an upper filter cover 46 having the water supply pipe 25 passing therethrough, and closing the pump 20 and the tops of the first and second filters 42 and 44.

Meanwhile, the second filter 44 may be covered with the lower portion of the second filter 44 by the above-described lower filter cover 43, and the second filter 44 and the lower filter cover 43 may be manufactured to be a single part.

Meanwhile, when the lower filter cover 43 is integrally formed with the first filter 42 or may be combined with the first filter 42, the second filter 44 may be disposed over the lower filter cover 43. On the other hand, when the lower filter cover is integrally formed with the second filter 44 or may be combined with the second filter 42, the first filter 42 may be disposed over the lower filter cover 43.

In addition, only one of the first and second filters 42 and 44 may be disposed in the water tub 10 or a third filter not shown may be included.

Referring to FIGS. 1, 2, 3, and 5, the water supply plate 30 may be a plate having a smooth top 31, may have a water supply hole 32 at the center and a boss 33 protruding downward, and the water supply hole 32 may extend through the boss 33.

The water supply plate 30 may be formed in a disc shape in an embodiment of the present disclosure, but may be formed in other various shapes.

The top 31 of the water supply plate 30 may be a smooth surface that rises upward toward the edge 311, an edge protrusion 312 slightly protruding downward may be formed at the edge 311, the water supply hole 32 may be formed with a trumpet-shaped widening portion 321 of which the diameter gradually increases upward, and a nozzle cap 34 may be at least partially inserted into the water supply hole 32.

The nozzle cap 34 may include a stem 341, a plurality of stoppers 345 protruding outward from the stem 341 and circumferentially spaced apart from each other, and a head 342 formed at the top of the stem 341, and a head cover 343 widening upward may be formed at or coupled to the head 342.

The stem 341 of the nozzle cap 34 may be inserted in the water supply hole 32 such that the head cover 343 is slightly spaced upward apart from the water supply hole 32, a ring-shaped outlet 344 may be formed between the periphery of the trumpet-shaped widening portion 321 and the head cover 343, an end of the water supply 25 may be inserted in the water supply hole 32 or may be disposed under the water supply hole 32 such that the water outlet 27 of the water supply pipe 25 communicates with the water supply hole 32.

The stoppers 345 protruding from the stem 341 of the nozzle cap 34 are in contact with the wall around the water supply hole 32, whereby the nozzle cap 34 can be supported at a predetermined position in the water supply hole 32.

Accordingly, the water discharged from the water outlet 27 of the water supply pipe 25 is sprayed in a ring shape through the ring-shaped outlet 344, whereby it is supplied to the center of the top 31 of the water supply plate. The water supplied to the center of the top 31 flows on the top 31 toward the edge 311 and then may vertically drop from the edge 311.

Meanwhile, the water supply plate 30 may be a light guide plate made of stainless steel or a transparent or translucent material and may have a very small thickness.

The plate support 36 supporting the water supply plate 30 may be disposed under the water supply plate 30 and may be installed on a luminous body support 62 to be described below or on the light guide plate 63.

The plate support 36 may include an outer ring 361 being in contact with the outer bottom and the edge protrusion 312 of the water supply plate 30, a hub ring 362 disposed at the center, and a plurality of spokes 363 connecting the outer ring 361 and the hub ring 362. A boss 364 may protrude downward from the hub ring 362.

The boss 33 of the water supply plate 30 may be inserted in the hub ring 32 of the plate support 36 and a hole 365 formed at the boss 364, and a packing ring 37 may be forcibly inserted between both the bosses 33 and 364.

The water supply pipe 25 may be disposed under the water supply plate 30 such that the water outlet 27 communicate with the water supply hole 32 of the water supply plate 30 through the partition plate 38 disposed spaced downward apart from the plate support 36.

Meanwhile, a third UV filter 39 as a sterilization filter for sterilizing water passing through the water supply pipe 25 or discharged from the water outlet 27 may be disposed around the water supply pipe 25. The third UV sterilization filter 39 may be a long cylinder elongated up and down.

A widening hole 331 may be formed at the lower portion in the water supply hole 32 formed at the boss 33 of the water supply plate 30, the upper portion 491 of the third UV filter 49 may be inserted in the widening hole 331, the packing ring 37 may be inserted between the boss 364 of the plate support 36 and the third UV filter 49, the lower end of the third UV filter 49 may be disposed on the partition plate 38, and the water supply 25 may pass through the third UV filter 49.

The third UV filter 49 may be disposed to cover a position higher than the water outlet 27 of the water supply pipe 25, whereby it is possible to improve sterilization effect by radiating UV light directly to the water discharged from the water outlet 27.

Meanwhile, a reinforcement ring 39 may be disposed on the bottom of the plate support 36 and may be supported by a reinforcement rib 621 of a luminous body support 62 to be described below.

The water supply plate 30 is moved up against elasticity of the packing ring 37, whereby the water supply plate 30 can be separated from the plate support 36. Accordingly, the water supply plate 30 can be replaced with a water supply plate having a different shape or height.

A lighting device 60 may be installed under the water supply plate 30 and the plate support 36.

Figure 4:
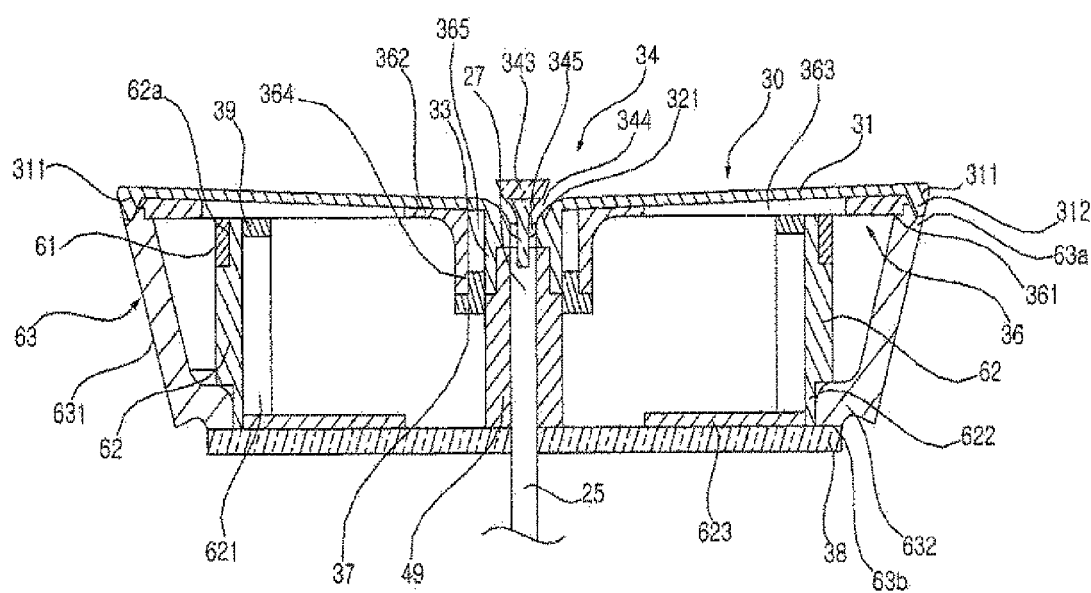
FIG. 4 is a cross-sectional view in which the components shown in FIG. 3 and a lighting device included in the present disclosure are combined.
Figure 5:
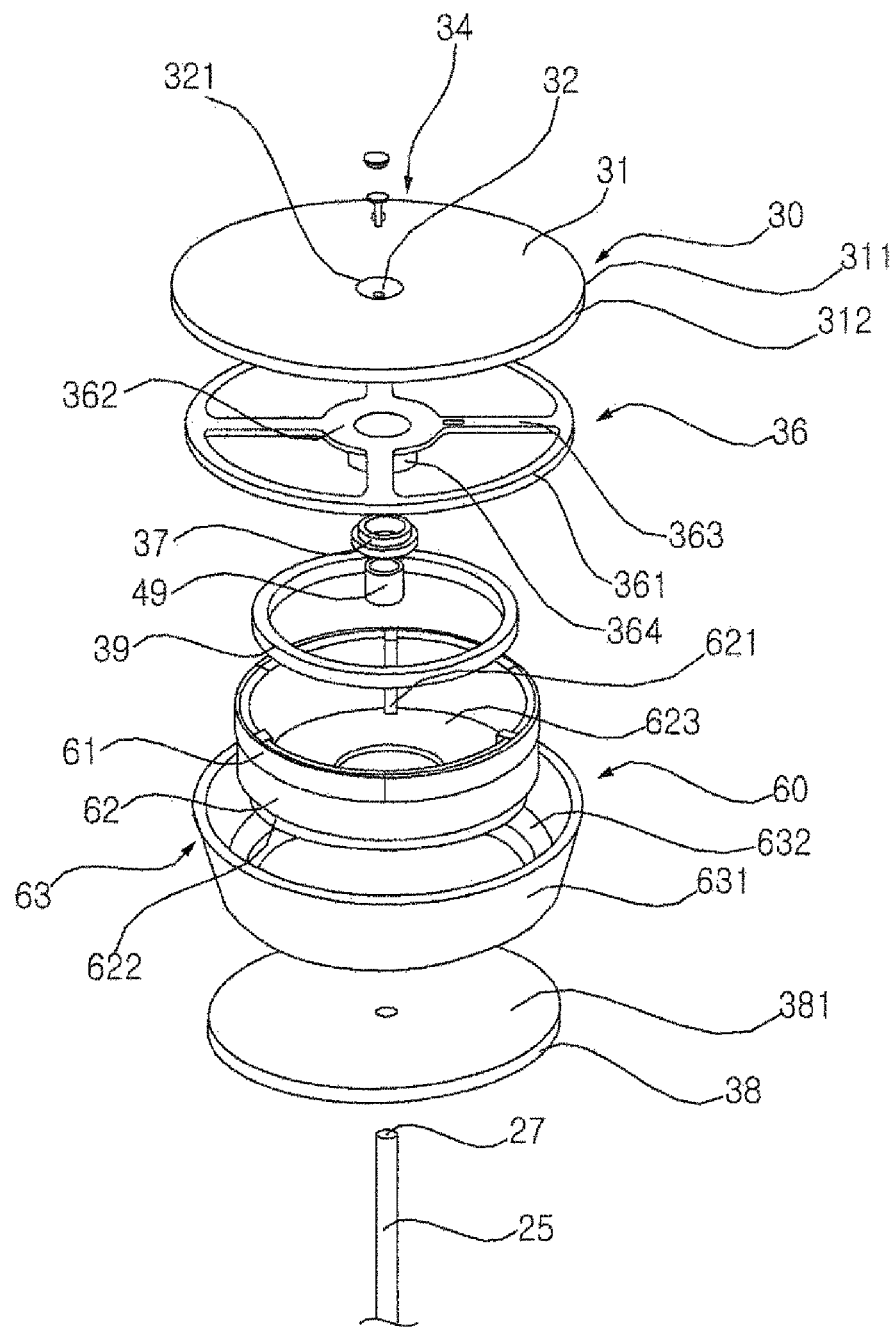
FIG. 5 is an exploded perspective view showing the components shown in FIG. 4.

Referring to FIGS. 2, 4, and 5, the lighting device 60 includes a luminous body 61, a support body 62 on which the luminous body 61 is installed, a light guide plate 63 disposed outside the support body 62, and the partition plate 38 on which the support body 62 and the light guide plate 63 are mounted, and the support body 62 may be formed in a cylindrical shape.

Figure 7:
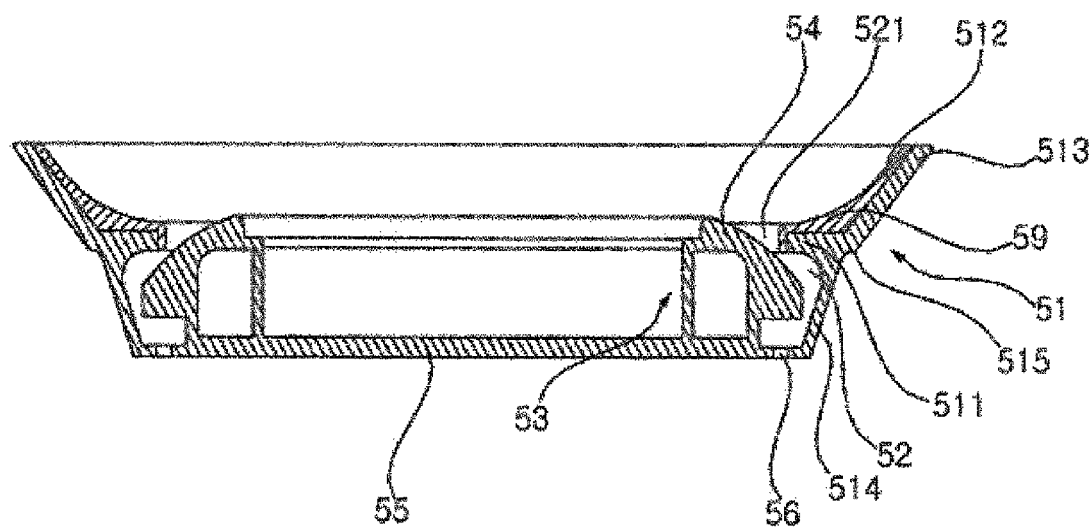
FIG. 7 is a cross-sectional view showing a water tray according to an embodiment different from that of FIG. 6.
Figure 8:
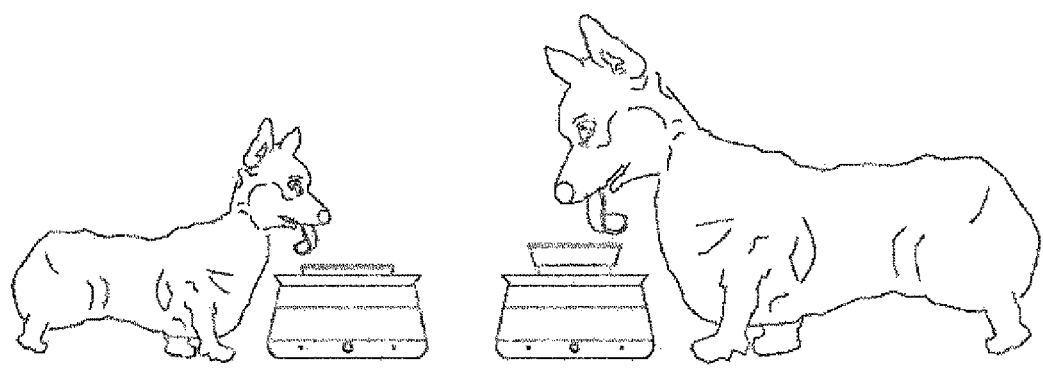
FIG. 8 is a view showing that a height of a water supply plate can be adjusted according to a size difference of a pet.
Figure 9:
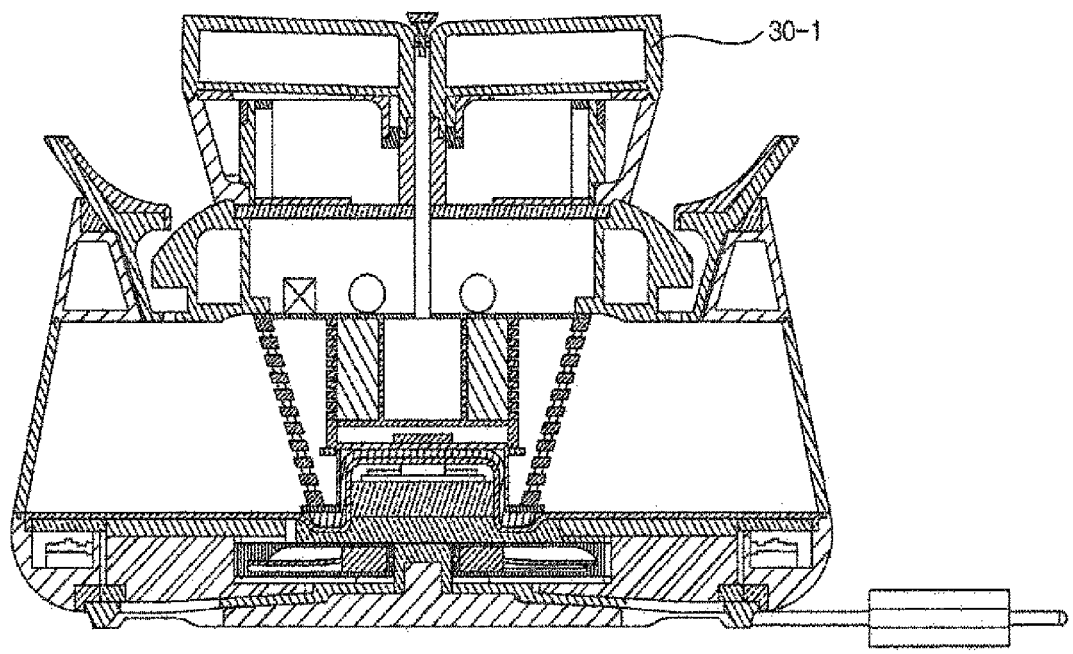
FIG. 9 is a view showing a water supplier for a pet when replaced with a thick water supply plate according to the first embodiment of the present disclosure.
Figure 10:
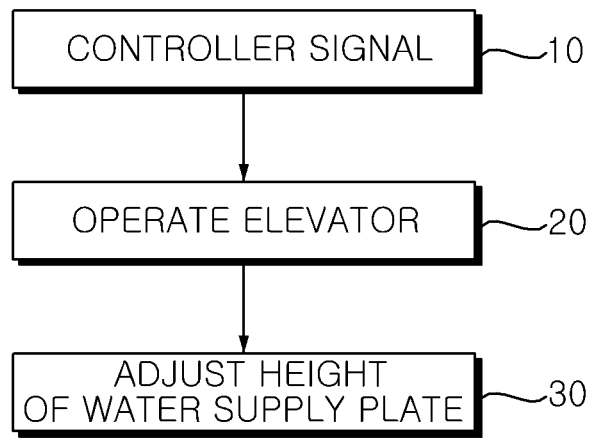
FIG. 10 is a flowchart showing that the height of the water supply plate can be adjusted by operating a lifter by a control signal from a controller according to the second implementation of the present disclosure.

The light guide plate 62 may be formed in a trumpet shape widening upward, a top end 63a thereof, as shown in FIG. 7, may be in contact with the edge protrusion 312 of the water supply plate 30 and the outer ring 351 of the plate support 36 and a bottom end 63b thereof may be in contact with the partition plate 38.

The outer surface 631 of the light guide plate 63 forms an inclined surface gradually recessed downward from the edge 311 of the water supply plate 30, so the water dropping from the edge 311 of the water supply plate 30 can vertically drop without hitting against the light guide plate 63.

The luminous body 61 may be composed of a plurality of light emitting diodes and may be attached to the luminous body support 62 to form an array having a predetermined shape, or may be formed by a band-shape light emitting diode and may be attached to the support 62 in a ring shape. The luminous body 61 may be inserted and attached in a recession 62a recessed inward and formed on the outer circumferential surface of the upper portion of the support body 62.

The reinforcement rib 621 is formed on the inner surface of the support body 62 and can the reinforcement ring 38. The recession 62a recessed inward is formed at the lower portion and an inward protrusion 631 formed at the lower end portion of the light guide plate 63 can be inserted therein. A PCB 623 controlling light emission of the luminous body 61 protrudes from the lower portion of the support body 62 and may be disposed on the top of the partition plate 38.

The luminous body support 62, the light guide plate 63, and the partition plate 38 may be integrally bonded or thermally bonded or may be separably assembled.

Figure 6:
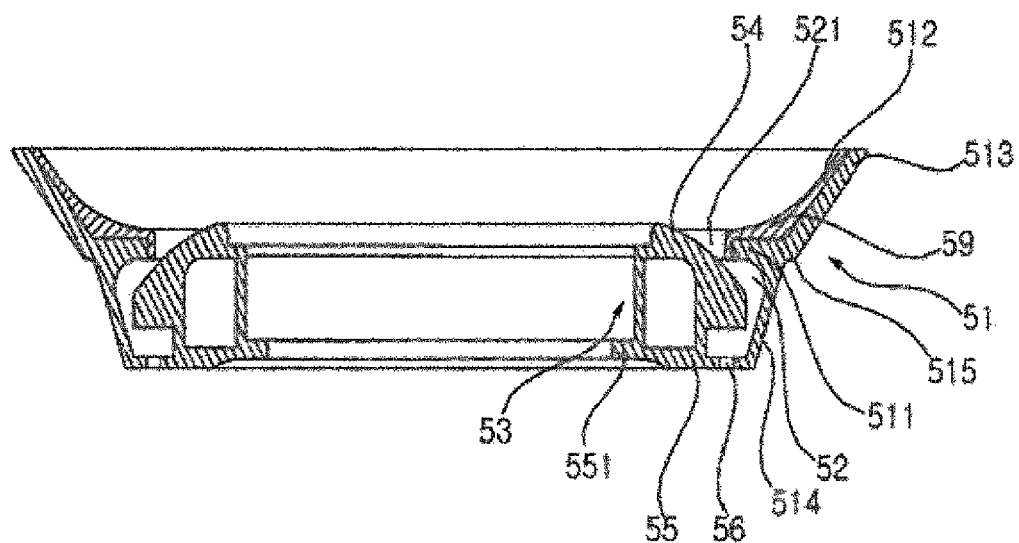
FIG. 6 is a perspective view showing a water tray according to the first embodiment of the disclosure.

Referring to FIGS. 1, 2, and 6, the water tray 50 is positioned under the water supply plate 30 and is disposed to cover the open top of the water tub 10, thereby receiving the water dropping from the edge 311 of the water supply plate 30 and discharging the water to the water tub 10.

The water tray 50 may have an outer wall 51 forming an outer edge, an inner wall 53 forming an inner edge and forming a drain passage 52 between the outer wall 51 and the inner wall 53, and a floor wall 55 connecting the lower portions of the outer wall 51 and the inner wall 53.

A discharge hole 56 for discharging the water dropping to the water tray 50 from the water supply plate 30 to the water tub 10 may be formed in the floor wall 55. The discharge hole may be one or more ring-shaped or circular holes formed in the circumferential direction of the floor wall 55.

A guide 54 protruding toward the outer wall 51 and inclined downward is formed on the inner wall 53, so the water dropping to the guide 54 from the water supply plate 30 can be guided downward along the guide 54 and the guide 54 may be formed to have a rounded surface.

Although it is exemplified that the guide 54 is formed on the inner wall 53 of the water tray 50 in an embodiment of the present disclosure, the guide may be formed on the outer wall 51 of the water tray and may protrude toward the inner wall 53.

Referring to FIG. 2, the upper portion of the guide 54 may be in contact with the lower end of the light guide plate 63 and a groove 5h41 is formed in the upper portion of the guide 54, so the edge of the partition plate 38 is positioned in the groove 541 and then the light guide plate 63 may be disposed on the upper portion of the guide 54 and the edge of the partition plate 38.

The light guide plate 63, the water tray 50, and the partition plate 38 may be separably assembled by a well-known method or may be fixed to each other by bonding, thermal bonding etc. When the water tray 50 is separably assembled, the water tray 50 can be replaced with another water tray having a different shape or height.

Referring to FIG. 6, a protrusion 511 may be formed toward the guide 54 on the inner surface of the outer wall 51 of the water tray 50, the inner surface 512 of the outer wall extending upward from the protrusion 511 may be a widening inclined surface, and a narrow drain passage 521 may be formed between the protrusion 511 and the guide 54.

Accordingly, the water dropping to the water tray 50 from the water supply plate 30 may stay for a while on the guide 54 and the protrusion 511 and then may move downward through the drain passage 521.

A coating layer 59 made of a material different from the water tray 50 may be coated with the inner surface 512 of the upper portion of the outer wall 51 and on the top of the protrusion 511, the guide 54 may be made of a material different from the water tray 50 such that aesthetic feeling can be improved or the sense of touch can be made soft and the dropping water is prevented from flying by hitting against it.

The outer wall 51 of the water tray may be higher than the inner wall 53, as shown in FIG. 2, and the outer wall 51 of the water tray is formed to be higher in height than the upper side wall 11a of the water tub, and may be formed to be wider than the upper side wall 11a to form a predetermined angle θ, for example, an angle of 120° to the outside with the upper side wall 11a.

The outer surface of the outer wall 51 of the water tray may be provided with an outer inclined surface having two-stage upper and lower inclined surfaces 513 and 514, a step 515 may be formed between the upper and lower inclined surfaces 513 and 514, and the lower inclined surface 514 of the water tray may be supported by being supported on the inner inclined surface 113 of the water tub 10.

In addition, the step 515 of the water tray may be seated to be locked to the first protrusive plate 111 formed on the upper side wall 11a, and the upper inclined surface 513 of the water tray 50 may be supported in contact with the packing 115 attached to the upper side wall 11a.

Accordingly, the water tray 50 may be hung on the upper side wall 11a and disposed firmly over the water tub 10.

Meanwhile, a protrusive step 551 protruding inward from the inner wall 53 may be formed on the floor plate 55 of the water tray 50. The protrusive step 551 may be positioned over the edge of the upper filter cover 46 described above.

Referring to FIG. 2, an electronic part compartment S isolated from the water tub may be formed among the upper filter cover 46, the inner wall 53 of the water tray, and the partition plate 38, and an auxiliary battery B and a controller C may be installed in the electronic part compartment S.

The protrusive step 551 of the water tray 50 and the upper filter cover 46 may be separably combined by well-known coupling parts such as female and male hooks or threads that are engaged with each other, or may be fixed to each other by thermal bonding or bonding methods.

Another embodiment of the water tray is shown in FIG. 7. The water tray shown in FIG. 7 is formed so that a bottom wall 55' completely covers the lower portions of the water tray, and the other components are the same as those of the embodiment of FIG. 6 described above.

On the other hand, since the water tray shown in FIG. 7 is formed such that the bottom wall 55' completely covers the lower portion of the water tray entirely, the bottom wall 55 may be coupled to be in contact with the upper portions of the first and second filters 42 and 44. Accordingly, the upper filter cover 46 can be omitted.

Meanwhile, the filter 40, the pump 20, the water supply pipe 25, the water supply plate 30, the lighting device 60, and the water tray 50 may be combined or assembled to be integral with each other to form a single inner assembly.

Accordingly, since the inner assembly is disposed in the water tub 10 to be detachable, the inner assembly may be separated from the water tub 10 to facilitate cleaning of the water tub and repair of various parts.

In addition, when the inner assembly is installed in the water tub 10, the outer wall 51 of the water tray 50 located at the upper portion edge of the inner assembly is supported by hanging on the upper side wall 11a of the water tub 30, and the lower filter cover 43 located in the lower center of the inner assembly is covered on the protrusion 121 formed on the floor plate 12 of the water tub. Accordingly, the inner assembly 100 can be stably installed at a predetermined position without moving in the water tub 10. Further, it is possible to separate the inner assembly 100 from the water tub by holding and lifting the outer wall 51 of the water tray 50 upward from the water tub 10.

Referring to FIG. 2, the power supply device may include a docking station 71 and the docking station 71 may include a weight body 711 having considerably weight, a cylindrical protrusive rod 712 formed at the center of the weight body 711, a first connection terminal (not shown) disposed at the protrusive rod 712, and a wire 713 applying external power to the first connection terminal.

A power circuit 715 electrically connected to the second connection terminal may be installed in the space formed among the floor plate 12 of the water tub 10, the base 118, and the lower edge wall 11b.

The wireless power transmitter 72 electrically connected to the power circuit 715 may be installed under the floor plate 12 of the water tub 10 and a wireless power receiver 73 generating an inductive voltage through induction with the wireless power transmitter 72 may be installed in the water tub 10.

The wireless power transmitter 72 is disposed in the space inside the protrusion 121 formed on the floor plate 12 and the wireless power receiver 73 is disposed between the lower filter cover 43 disposed over the protrusion 121 and the pump 20.

The wireless power receiver 73 may be connected through a controller (C), and power required for movement of the controller C and various components operating through signals from the controller may be supplied through the wireless power receiving unit 73.

Hereinafter, the height adjustment of the water supply plate according to the first embodiment of the present invention will be described with reference to FIGS. 2 to 4 and 8 to 9.

As pets using a water supplier, animals with various body types and sizes depending on the species or age may be used. In this case, the height of the water supply plate provided so that pets can drink water may be relatively too high or too low compared to pets, so it is necessary to adjust the height of the water supply plate so that the pets using the water supplier can eat water comfortably.

According to the first embodiment of the present invention, in order to adjust the height of the water supply plate, the water supply plate 30 may be replaced with a water supply plate 30-1 having a thicker thickness. A state in which the replaced water supply plate 30-1 is installed may be seen in FIG. 9.

The water supply plate 30-1 is manufactured in the same shape as the water supply plate 30 except for a portion having a thicker thickness. Accordingly, the water supply hole 32 and the plate support 36 of the water supply plate are formed in the same manner as water supply plate 30 of FIG. 2. However, since the thickness of the water supply plate 30-1 is changed, the boss 33 formed in the thickness direction of the water supply plate is formed to extend as much as the thickness of the water supply plate 30-1.

The nozzle cap 34 is formed to be detachable. Therefore, when replacing the water supply plate, the nozzle cap 34 provided on the existing water supply plate 30 may be removed, another water supply plate 30-1 may be inserted, and then the nozzle cap 34 may be inserted into the water supply plate 30-1 again.

The plate support 36 is provided under the water supply plates 30 and 30-1, and the water supply plates 30 and 30-1 are detachable from the plate support 36. Therefore, when replacing the water supply plate, the removal and attachment from the plate support may be repeatedly performed.

According to the embodiment of the present invention, only one thick water supply plate 30-1 is disclosed, but is not limited thereto, and the water supply plates of various thicknesses according to the thickness may be provided, and thus, depending on pets, it may be replaced with a water supply plate having the height at which pets can drink most comfortably.

Hereinafter, a height adjustment of a water supply plate according to a second embodiment of the present invention will be described with reference to FIGS. 8 to 10 and 11 to 16. Matters other than the contents of the second embodiment to be described later are the same as those of the first embodiment described above.

The second embodiment of the present invention includes a plate support 62' for supporting a water supply plate from a lower side of a water supply plate 30', and a water tray 50' for discharging water dropping from the water supply plate to a water tank, and the water tray 50' includes an outer wall 51' and an inner wall 53' that is spaced inward apart from the outer wall to form a drain passage, the inner wall is provided with a guide 54' that protrudes toward the outer wall and is inclined downward, and the upper end of the guide is provided with a cylindrical slide ring 541' protruding in the direction of the water supply plate.

The plate support 62' includes a slide ring insertion portion 62a' into which the slide ring 541' is inserted, a luminous body insertion portion 62b' into which a luminous body 61 is inserted, a plate support portion 62c' connected to a partition plate 38' to support a water supply plate 30', and a protrusion 62d' protruding toward the guide 54'.

A lower portion of the plate support 62' is provided with the partition plate 38' for supporting the plate support, and a lower portion of the partition plate is provided with an elevator L for elevating the partition plate.

According to the second embodiment of the present invention, two elevators L1 and L2 are formed, but the number of elevators is not limited thereto, and a plurality of elevators may be formed.

Figure 13:
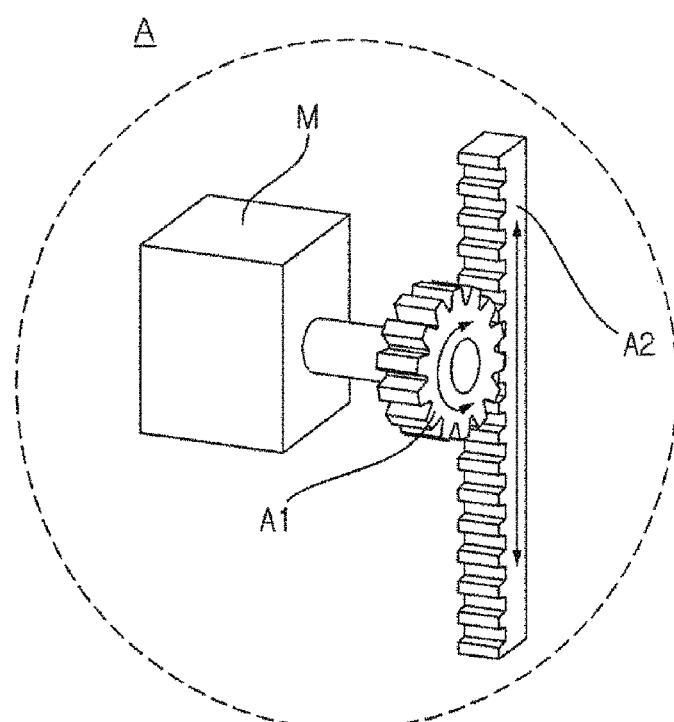
FIG. 13 is a view showing a configuration of an elevator A of FIG. 11.
Figure 14:
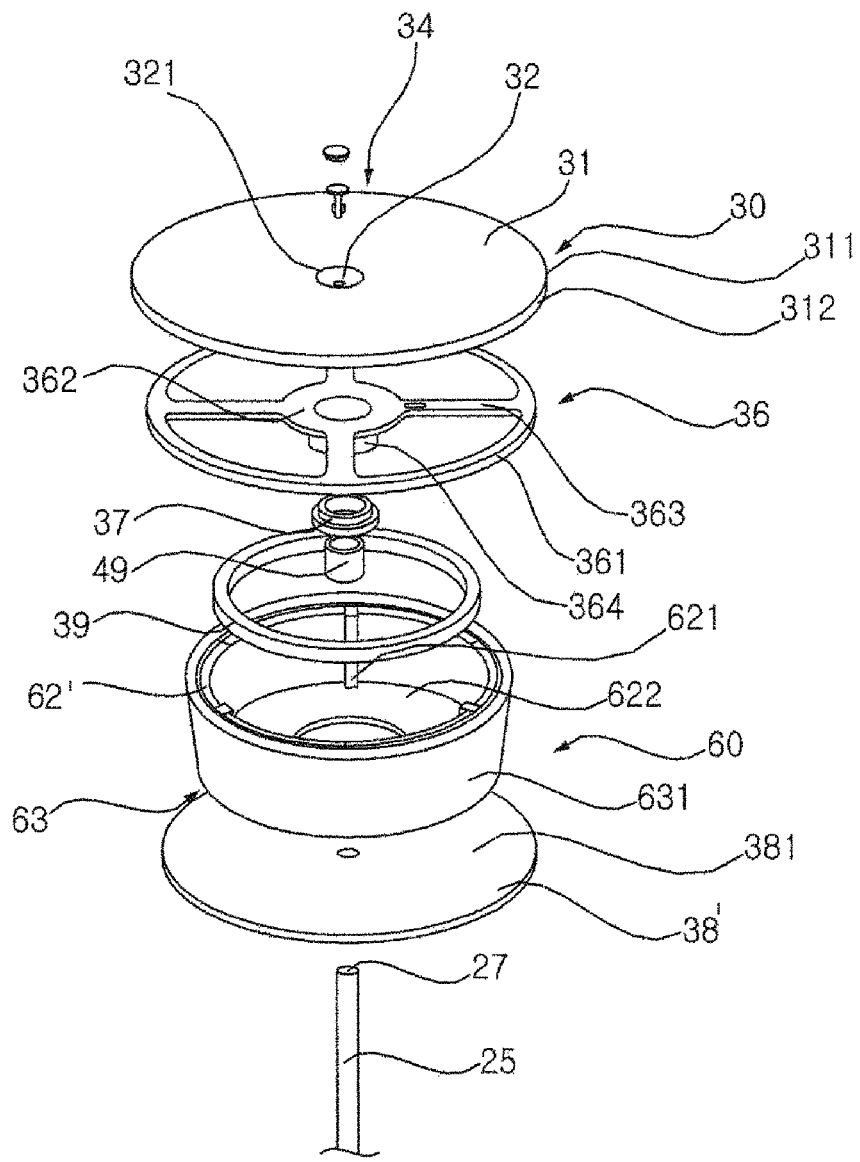
FIG. 14 is an exploded perspective view of the water supply plate and the peripheral components according to the second embodiment of the present disclosure.
Figure 15:
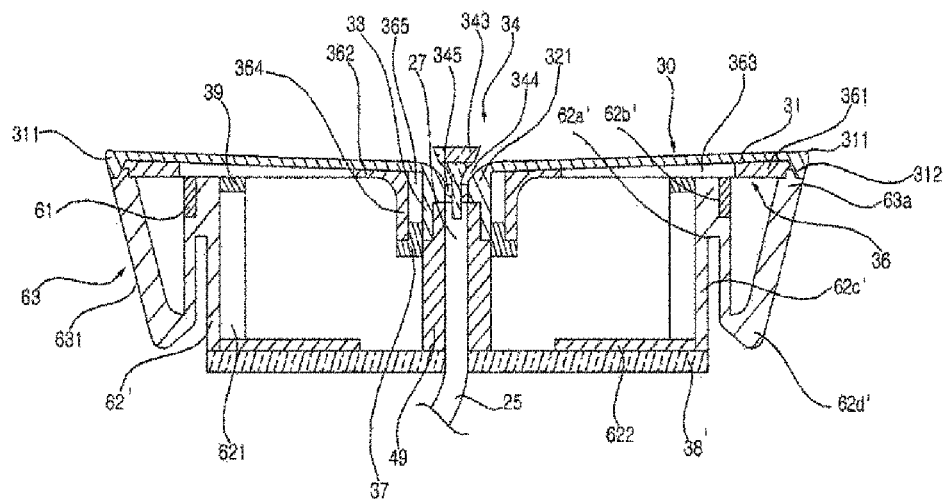
FIG. 15 is a cross-sectional view of the water supply plate and the peripheral components according to the second embodiment of the present disclosure.
Figure 16:
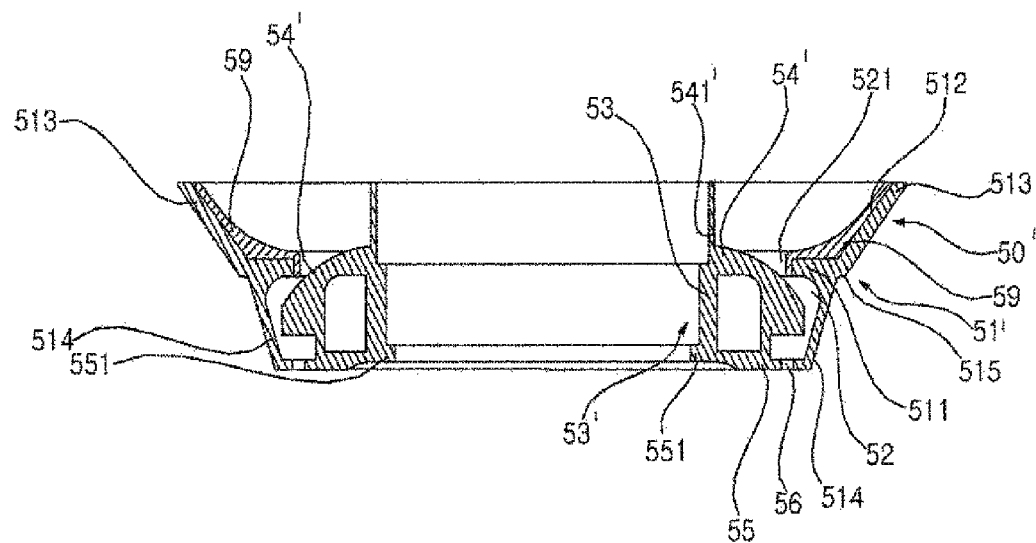
FIG. 16 is a cross-sectional view of a water tray according to the second embodiment of the disclosure.

The elevator L according to the second embodiment of the present invention may elevate the partition plate through a rack pinion structure as disclosed in FIG. 13. Accordingly, when the motor M is driven, a first gear A1 rotates together, and a second gear A2 engaged with the first gear moves up and down, so the partition plate 38 can be elevated. The first gear may be formed as a pinion gear, and the second gear may be formed as a rack gear.

However, the configuration of the elevator L according to the second embodiment of the present invention is not limited to the configuration of FIG. 13, and various lifting means capable of moving the partition plate up and down may be implemented.

The user may set the height of the water supply plate 30' by a setting means (not shown). When the height of the water supply plate is set, the control unit C detects the set height setting information of the water supply plate through the setting means (not shown), and transmits the signal to the elevator L (S10). Thereafter, the elevator L elevates the partition plate 38' in contact with the elevator L according to the received height setting information of the water supply plate (S20). As the partition plate 38' is elevated, the structure provided on the upper portion of the partition plate is elevated together with the partition plate. In this case, the water supply plate 30' may also be positioned at the setting position according to the height setting information while being elevated together with the partition plate 38' (S30).

However, there is a problem in that when the water supply plate rises, a predetermined space may be formed between the water tray and the water supply plate, and water dropping from the end of the water supply plate may flow into the electronic part compartment S formed inside the water tray through the space.

Therefore, in order to solve this problem, the slide ring 541' is formed on the upper portion of the guide 54' of the water tray 50' and the sliding insert portion 62' is formed on the plate support 62'.

Figure 11:
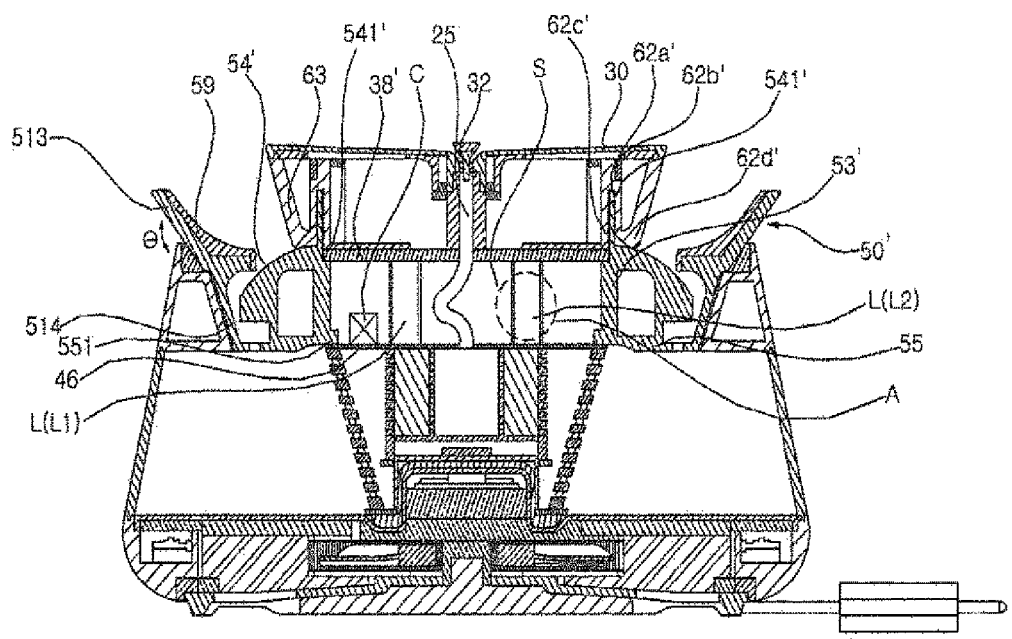
FIG. 11 is a cross-sectional view of a water supplier for a pet according to a second embodiment of the present disclosure.

When the water supply plate 30' is located at the bottom, as shown in FIG. 11, the slide ring 541' is located while being inserted into the slide ring insertion portion 62a', and the protrusion 62d' comes into contact with the guide 54', and thus, the light guide plate 63, the protrusion 62d', and the guide 54' form a continuous outer line. As a result, the water dropping to the end of the water supply plate is blocked from entering the electronic part compartment S by the outer line.

Figure 12:
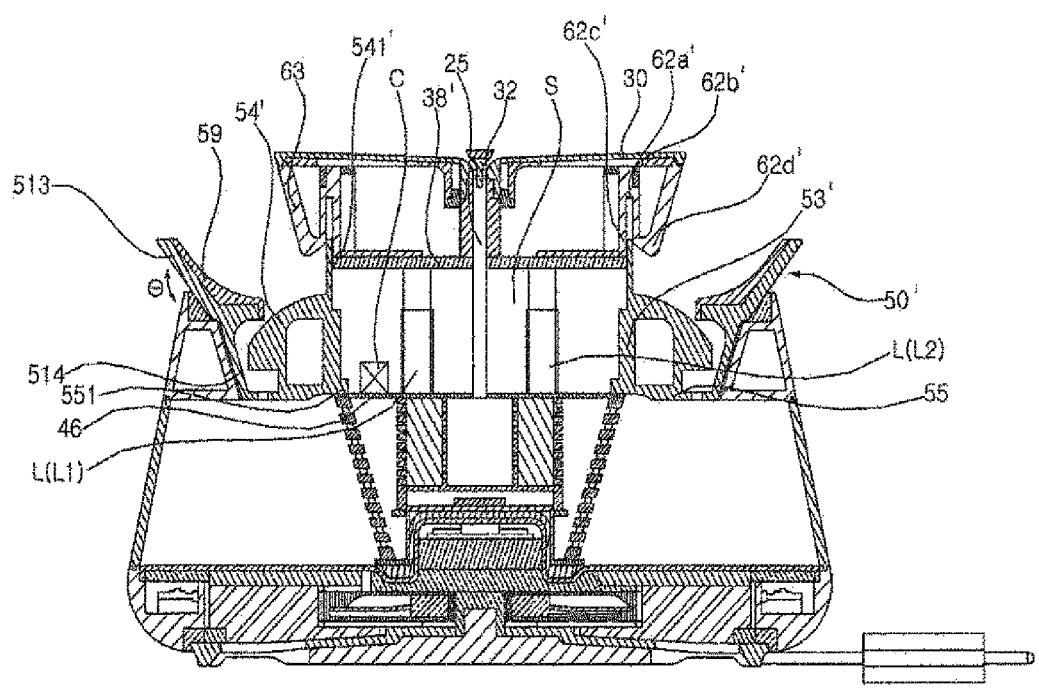
FIG. 12 is a cross-sectional view showing that a water supply plate and the peripheral components of the water supplier for a pet according to the second embodiment of the present disclosure are elevated.

When the water supply plate 30' is located at the top, as shown in FIG. 12, the slide ring 541' comes out of the slide ring insertion portion 62a' to some extent, and at the same time, the slide ring 541' is formed in the space between the protrusion portion 62d' and the guide 54, and thus, the light guide plate 63, the protrusion 62d', the slide ring 541', and the guide 54' form a continuous outer line. As a result, the water dropping to the end of the water supply plate is also blocked from entering the electronic part compartment S by the outer line.

In addition, even when the water supply plate 30' is located in the middle position except for the top and bottom ends, the slide ring 541' still forms an outer line, so that the inflow of dropping water is blocked as in the case where the water supply plate is located at the top.

In this case, since the protrusion 62d' of the plate support protrudes in a smooth curve downward, most of the water flowing along the light guide plate 63 drops directly to the guide 54' through the protrusion 62d' by gravity, and only a small amount of water depending on the surface tension flows along the slide ring 541', so the possibility that water may flow back into the gap between the slide ring 541' and the slide ring insertion part 62a' may be minimized.

In accordance with the elevation of the water supply plate 30', the water supply pipe 25 connected to the water supply plate 30' is formed in a length capable of connecting the water supply plate 30' and the pump 20 even when the water supply plate 30' is at least located at the top. In this case, in order to serve as the water supply pipe even when the water supply plate 30' descends, the water supply pipe 25 should be formed of a bendable material.

As a result, according to the second embodiment of the present invention, the position of the water supply plate that the user wants and pets can drink water comfortably may be set through the elevator L and the controller C.

Figure 17:
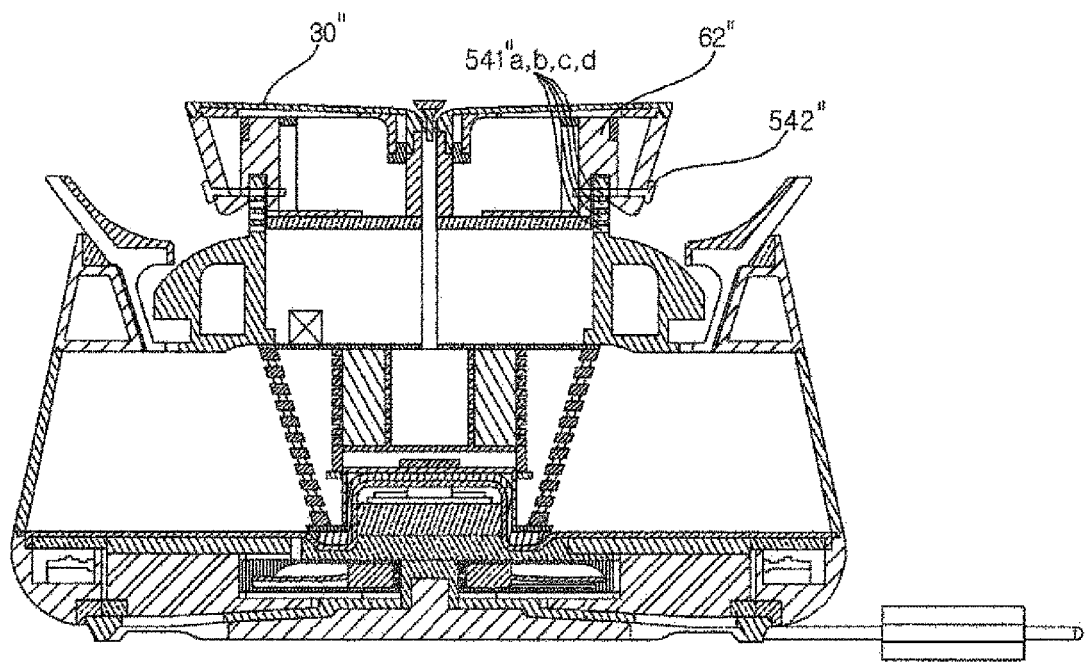
FIG. 17 is a cross-sectional view of a water supplier for a pet according to a third embodiment of the present disclosure.

Hereinafter, a height adjustment of a water supply plate according to a third embodiment of the present invention will be described with reference to FIG. 17. Matters other than the contents of the third embodiment to be described later are the same as those of the first and second embodiments described above.

According to the third embodiment, coupling holes 541"a, b, c, and d are formed in the slide bar 541" at regular intervals according to the height of the slide bar, and the coupling holes 541"a, b, c, and d and the fixing bar 542" passing through the water supply plate support 62" are inserted into one of the coupling holes 541"a, b, c, and d to fix the water supply plate 30" and the configuration of the water supply connected thereto.

In summary, by selectively penetrating the fixing bar through one of the plurality of coupling holes provided in the height direction, it is possible to adjust the height of the water supply plate. According to the embodiment of the present invention, the coupling holes 541"a, b, c, and d are formed in four, but the number of coupling holes is not limited thereto, and the plurality of coupling holes are arranged in the height direction, and it is sufficient if the height of the water supply plate is variously set according to one of the coupling holes and the fixing bar inserted into the coupling hole.

It should be understood that the accompanying drawings are provided only in order to allow exemplary embodiments of the present disclosure to be easily understood, and the spirit of the present disclosure is not limited by the accompanying drawings, but includes all the modifications, equivalents, and substitutions included in the spirit and the scope of the present disclosure.

In addition, although the preferred embodiments of the present disclosure have been illustrated, the present disclosure is not limited to the specific embodiments described above, and can be variously modified by those skilled in the art to which the present disclosure pertains without departing from the gist of the present disclosure claimed in the claims, and these modifications should not be understood individually from the technical ideas or prospects of the present disclosure.

What is claimed is:

1. A water supplier for a pet, comprising:
a water tub;
a pump pumping water stored in the water tub;
a water supply pipe delivering water discharged from the pump; and
a water supply plate supplied with the water from the water supply pipe,
wherein a height of the water supply plate is adjustable, and
wherein the water supply plate includes replaceable first and second water supply plates, and the second water supply plate is thicker than the first water supply plate.

2. The water supplier of claim 1, wherein the water supply plate includes at least three replaceable water supply plates, and the at least three replaceable water supply plates have respective different thicknesses.

3. The water supplier of claim 1, further comprising:
a plate support installed under the water supply plate to support the water supply plate,
wherein the first water supply plate and the second water supply plates are detachable from the plate support.

4. The water supplier of claim 1, wherein a center of the water supply plate includes a water supply hole, and the water supplier further comprises a nozzle cap that is configured to be inserted into the water supply hole and to be detachable from the water supply plate.

5. The water supplier of claim 1, wherein the first water supply plate and the second water supply plate have a common shape when viewed in plan.

6. A water supplier for a pet, comprising:
a water tub;
a pump pumping water stored in the water tub;
a water supply pipe delivering water discharged from the pump;
a water supply plate supplied with the water from the water supply pipe;
an elevator installed under the water supply plate to move the water supply plate up and down to adjust a height of the water supply plate; and
a controller operating the elevator so that the water supply plate reaches a set height.

7. The water supplier of claim 6, further comprising:
a plate support body supporting the water supply plate from a lower side;
a water tray installed under the plate support and discharging water dropping from the water supply plate to the water tub; and
a slide ring protruding from an upper end portion of the water tray,
wherein the slide ring is slidably coupled to the plate support body.

8. The water supplier of claim 7, wherein
the water tray includes an outer wall and an inner wall spaced apart from the outer wall in an inner direction to form a drain passage,
the inner wall includes a guide formed to be inclined downward toward the outer wall, and
the slide ring protrudes from the upper end portion of the guide in a direction of the water supply plate.

9. The water supplier of claim 7, wherein
the plate support body includes a slide ring insert portion formed in a direction perpendicular to the water supply plate, and
the slide ring is slidably coupled through the slide ring insert portion.

10. The water supplier of claim 7, wherein the plate support body includes a protrusion formed in the direction of the water tray, and the protrusion has a smooth curved surface.

11. The water supplier of claim 6, further comprising:
a plate support body supporting the water supply plate from a lower side; and
a partition plate connected to the lower end of the plate support body,
wherein the elevator is installed under the partition plate to move the plate support body and the water supply plate up and down together with the partition plate.

12. The water supplier of claim 11, wherein an outside of the plate support body includes a light guide plate, and the light guide plate moves together with the plate support body.

13. The water supplier of claim 6, wherein the elevator includes a motor, a first gear rotated by the motor, and a second gear engaged with the first gear and linearly moving by rotation of the first gear.

14. The water supplier of claim 13, wherein the second gear moves linearly in a vertical direction with the water supply plate.

15. The water supplier of claim 12, further comprising a luminous body provided on the plate support body and configured to emit light through the light guide plate.

16. The water supplier of claim 6, wherein the water supply pipe is made of a bendable material.

17. The water supplier of claim 6, wherein the elevator includes a first elevator and a second elevator, and the wire supply pipe is provided between the first elevator and the second elevator.

18. The water supplier of claim 6, wherein the controller receives height setting information and operates the elevator based on the height setting information such that an upper surface of the water supply plate is positioned at the set height.

19. A water supplier for a pet, comprising:
a water tub;
a pump pumping water stored in the water tub;
a water supply pipe delivering water discharged from the pump;
a water supply plate supplied with the water from the water supply pipe, a height of the water supply plate being adjustable;
a plate support body supporting the water supply plate from a lower side;
a water tray installed under the plate support body and discharging water dropping from the water supply plate to the water tub; and
a slide ring protruding upward from the water tray and inserted into the plate support body,
wherein the slide ring includes a plurality of coupling holes, and includes a fixing bar installed to selectively penetrate one of the plurality of coupling holes passing through the plate support body.

20. The water supplier of claim 19, wherein the plurality of coupling holes are formed at regular intervals in a vertical direction to the water supply plate.

\* \* \* \* \*

UNITED STATES PATENT AND TRADEMARK OFFICE
CERTIFICATE OF CORRECTION

| | | |
|---|---|---|
| PATENT NO. | : 12,029,206 B2 | Page 1 of 1 |
| APPLICATION NO. | : 17/277915 | |
| DATED | : July 9, 2024 | |
| INVENTOR(S) | : Yoo et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 287 days.

Signed and Sealed this
Twelfth Day of August, 2025

Coke Morgan Stewart
*Acting Director of the United States Patent and Trademark Office*